United States Patent [19]
de Fréminville et al.

[11] 4,166,514
[45] Sep. 4, 1979

[54] DEVICES FOR CONTROLLING A SPEED RESTRICTION FOR VEHICLES, PARTICULARLY MOTOR VEHICLES

[75] Inventors: Jean-Claude de Fréminville, Garches; Michel Horblin, Courbevoie, both of France

[73] Assignee: Societe Anonyme Automobiles Citroen, Paris, France

[21] Appl. No.: 796,237

[22] Filed: May 12, 1977

[30] Foreign Application Priority Data

May 19, 1976 [FR] France ................... 76 15092

[51] Int. Cl.² ............................................. B60K 31/00
[52] U.S. Cl. .................... 180/167; 123/102;
180/179; 246/182 R
[58] Field of Search ................. 180/98, 105 R, 105 E,
180/108, 109; 123/102; 246/182 R, 187 B;
361/236–242; 236/292 FQ, 292 TC

[56] References Cited

U.S. PATENT DOCUMENTS

| | | | |
|---|---|---|---|
| 3,378,102 | 4/1968 | Collin et al. ........................ | 180/98 |
| 3,507,349 | 4/1970 | Comer et al. ....................... | 180/98 |
| 3,582,971 | 6/1971 | Coccia ................................ | 246/182 |
| 3,715,006 | 2/1973 | Walsh ............................ | 123/102 X |
| 3,763,954 | 10/1973 | Permut et al. ..................... | 180/98 |
| 3,862,438 | 1/1975 | Sakakibara et al. ............... | 307/238 |
| 3,866,102 | 2/1975 | Hashimoto et al. ............... | 318/609 |
| 3,985,195 | 10/1976 | Tixier ................................. | 180/98 |
| 4,068,734 | 1/1978 | Foeller .............................. | 180/98 |

FOREIGN PATENT DOCUMENTS

| | | |
|---|---|---|
| 2329522 | 1/1974 | Fed. Rep. of Germany . |
| 2214607 | 8/1974 | France . |
| 2270117 | 12/1975 | France . |
| 1080809 | 8/1967 | United Kingdom . |
| 1109060 | 4/1968 | United Kingdom . |
| 1323001 | 7/1973 | United Kingdom . |
| 1339552 | 12/1973 | United Kingdom . |
| 1342988 | 1/1974 | United Kingdom . |
| 1350852 | 4/1974 | United Kingdom . |
| 1458659 | 12/1976 | United Kingdom . |

Primary Examiner—Joseph F. Peters, Jr.
Assistant Examiner—Donn McGiehan
Attorney, Agent, or Firm—Stevens, Davis, Miller & Mosher

[57] ABSTRACT

A device for automatically controlling a speed restriction from information coming from outside the vehicle, comprising means for analysing and decoding the information and control means for maintaining the speed of the vehicle at a value equal to that of the speed limit. The device comprises coding means for coding the information coming from outside; program means able to make correspond to each speed limit a voltage associated with this speed and electrical connection means between the program means and the speed control means, these electrical connection means being responsive to the coding of the speed limit and able to select the voltage corresponding to the coded speed.

11 Claims, 21 Drawing Figures

| PULSES NUMBER | $B_1 \cdot h_1$ | $B_2 \cdot h_2$ | $B_3 \cdot h_3$ | SPEED |
|---|---|---|---|---|
| 1 | 1 | 1 | 1 | 130 km/h |
| 2 | 0 | 1 | 1 | 110 |
| 3 | 1 | 0 | 1 | 90 |
| 4 | 0 | 0 | 1 | 80 |
| 5 | 1 | 1 | 0 | 60 |
| 6 | 0 | 1 | 0 | 45 |

Fig. 8.

| PULSES NUMBER | SPEED Km/h | FLIP-FLOP | | | INTERMEDIATE POINTS | | | | | |
|---|---|---|---|---|---|---|---|---|---|---|
| | | B1 | B2 | B3 | m1 130 | m2 110 | m3 90 | m4 80 | m5 60 | m6 45 |
| 1 | 130 | 1 | 1 | 1 | 1 | 1 | 1 | 1 | 1 | 1 |
| 2 | 110 | 0 | 1 | 1 | 0 | 1 | 0 | 1 | 0 | 1 |
| 3 | 90 | 1 | 0 | 1 | 0 | 0 | 1 | 1 | 1 | 0 |
| 4 | 80 | 0 | 0 | 1 | 0 | 0 | 0 | 1 | 0 | 0 |
| 5 | 60 | 1 | 1 | 0 | 0 | 0 | 0 | 0 | 1 | 1 |
| 6 | 45 | 0 | 1 | 0 | 0 | 0 | 0 | 0 | 0 | 1 |
| RESET | MEMORY | 0 | 0 | 0 | 0 | 0 | 0 | 0 | 0 | 0 |

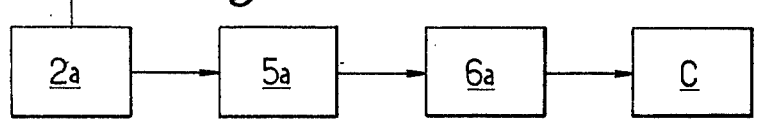
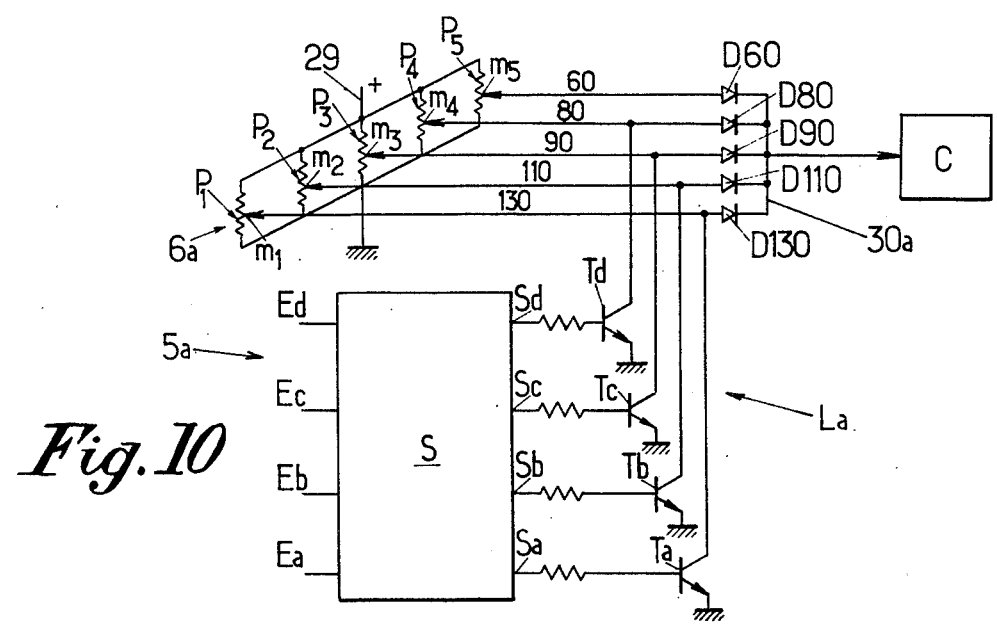

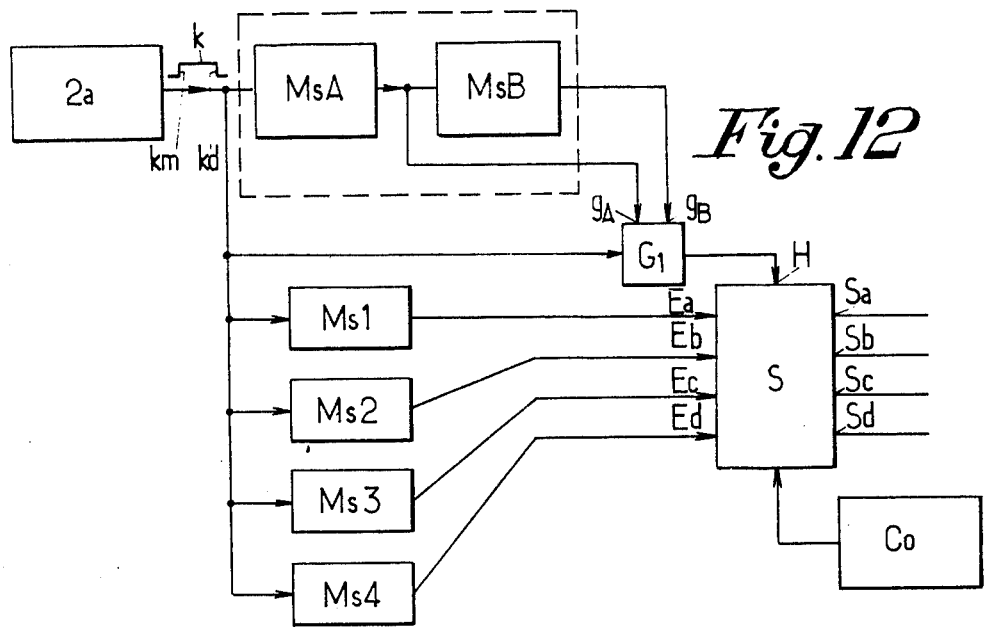
Fig.12
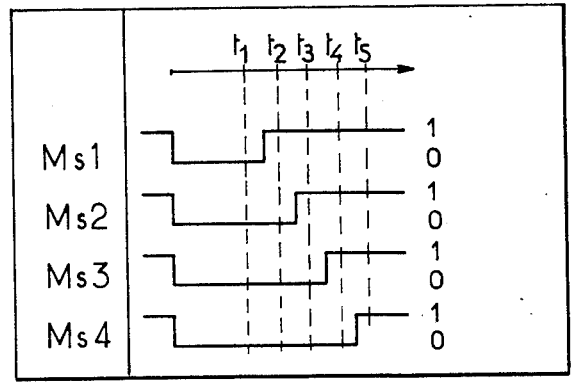
Fig.13
Fig.14
| $t_1$ | $t_2$ | $t_3$ | $t_4$ | $t_5$ | |
|---|---|---|---|---|---|
| 0 | 1 | 1 | 1 | 1 | Sa |
| 0 | 0 | 1 | 1 | 1 | Sb |
| 0 | 0 | 0 | 1 | 1 | Sc |
| 0 | 0 | 0 | 0 | 1 | Sd |
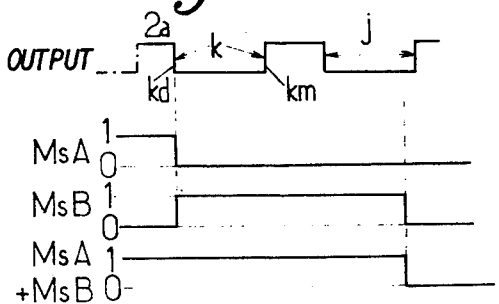
Fig.15

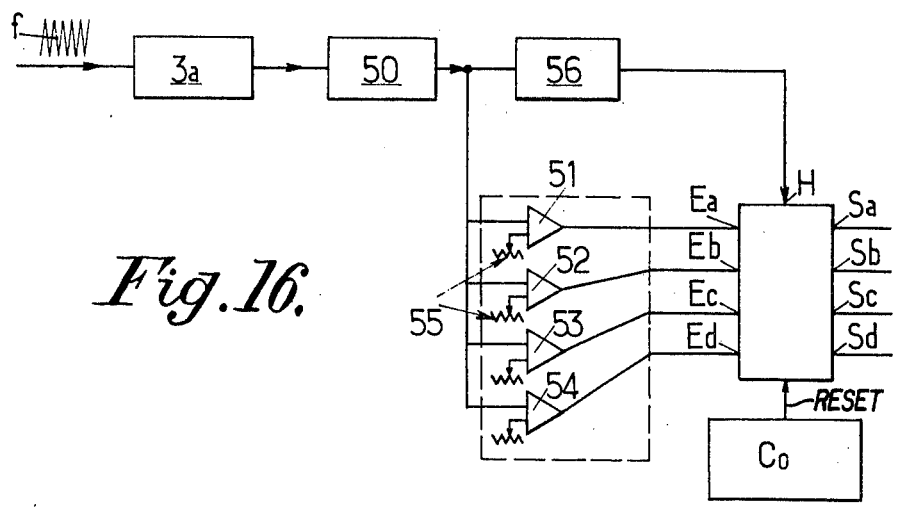
Fig.16.
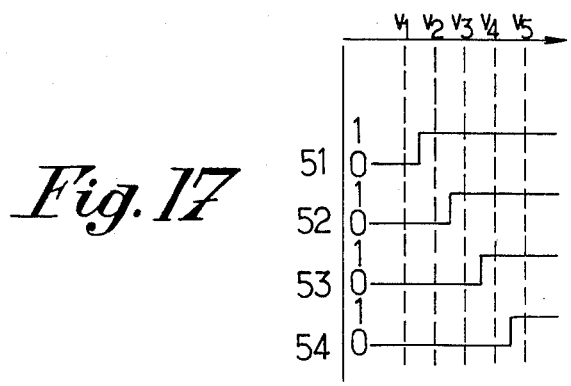
Fig.17
Fig.18
|    | $V_1$ | $V_2$ | $V_3$ | $V_4$ | $V_5$ |
|----|-------|-------|-------|-------|-------|
| Sa | 0 | 1 | 1 | 1 | 1 |
| Sb | 0 | 0 | 1 | 1 | 1 |
| Sc | 0 | 0 | 0 | 1 | 1 |
| Sd | 0 | 0 | 0 | 0 | 1 |

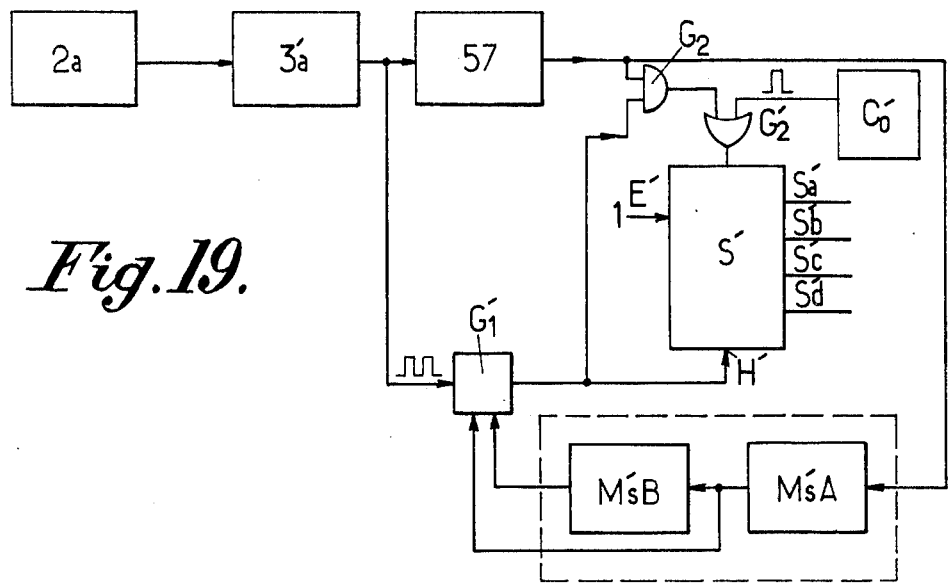
*Fig.19.*
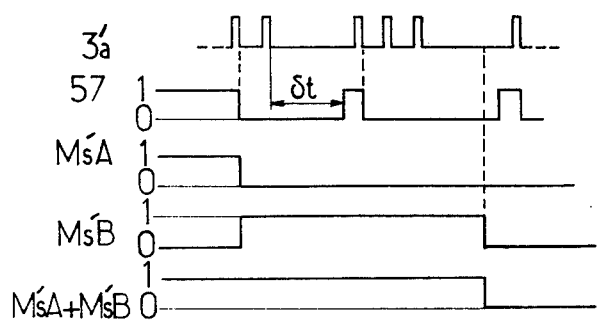
*Fig.20.*
| | BLIPS NUMBER | | | | |
|---|---|---|---|---|---|
| | 1 | 2 | 3 | 4 | 5 |
| Sa | 0 | 1 | 1 | 1 | 1 |
| Sb | 0 | 0 | 1 | 1 | 1 |
| Sc | 0 | 0 | 0 | 1 | 1 |
| Sd | 0 | 0 | 0 | 0 | 1 |
*Fig.21.*

DEVICES FOR CONTROLLING A SPEED RESTRICTION FOR VEHICLES, PARTICULARLY MOTOR VEHICLES

The invention relates to a device for automatically controlling a restriction of the speed of a vehicle, particularly a motor vehicle, travelling over a stretch of road subject to a speed restriction, from information coming from outside the vehicle, a device of the kind which comprises:

information analysis and decoding means for making a determined value of the speed limit correspond to the information received;

means for controlling the speed of the vehicle responsive to the value of the speed for maintaining, on the stretch of road concerned, the speed of the vehicle at a value equal to that of the speed limit.

The invention has as its object especially the provision of a device which answers better than up to now to the different demands of practice and which permits a speed restriction to be controlled automatically and independently of the will of the driver. More particularly, the invention has as its aim the provision of a device simple in construction which allows the speed limit of the vehicle to be established with an accuracy substantially independent of the accuracy of the information that controls this speed limit. It is desirable for the device to be able operate from information which, while not requiring a complicated sub-structure for its emission, is complete for indicating as many speed limits as desired.

According to the invention a device for automatically controlling a restriction of the speed of a vehicle, from information coming from outside the vehicle and of the kind defined above, is characterized by the fact that the decoding and analysis means comprise in combination:

means for coding the information coming from the outside;

program means able to make correspond to each speed limit an electrical voltage associated with this speed;

and electrical connection means between the program means and the speed control means, these electrical connection means being responsive to the coding of the speed limit and able to select, in the program means, the electrical voltage corresponding to the coded speed so that the speed control means act in accordance with this electrical voltage and limit the speed of the vehicle to the corresponding speed.

The program means are advantageously formed by voltage dividing bridges, the number of these divider bridges being at least equal to the number of speed limits, each divider bridge comprising a point intermediate a constant voltage source and ground.

According to a first embodiment, the coding means can comprise a succession of flip-flops, the first flip-flop having an input to which arrive the pulses, preferably shaped, corresponding to the outside information, the output of each of these flip-flops being connected to a coding line.

The electrical connection means responsive to the coding of the speed limit comprise then, on the one hand, diodes connected so that they select the largest of the voltages appearing at the intermediate points of the divider bridges and, on the other hand, diodes connected between the intermediate points and the coding lines so that the voltage at the intermediate point of a divider bridge is systematically inhibited only if this voltage is greater than that corresponding to the speed limit appearing at the coding lines.

Memory means, formed especially by a capacitor, are able to store, in the form of an electric voltage, the value of the speed limit for the stretch of road concerned, these memory means being connected between the electrical connection means and the control means.

According to another embodiment;

the means for coding the information coming from outside comprise a shift register which has n outputs;

the program means comprise n+1 voltage divider bridges comprising each one a point intermediate a constant voltage source and ground, each intermediate point being connected to a common line by a diode, the n+1 diodes associated with the intermediate points being connected so that they let the largest of the voltages appearing at the intermediate points appear on the common line;

the electrical connection means are connected between, on the one hand, the n intermediate points whose voltage is normally higher than that of the intermediate point having the lowest voltage and, on the other hand, the n outputs of the shift register, these electrical connection means being responsive to the logic states of the outputs of the shift register and being such that, for a determined logic state at one output of the shift register, the electrical voltage at the intermediate point associated with this output is cancelled, whereas for the other logic state at the output of the shift register the electrical voltage at the intermediate point is maintained;

and the control means for controlling the speed of the vehicle are responsive to the value of the electrical voltage which appears on said common line connected to the intermediate points by the diodes.

Still according to this second embodiment, the electrical connection means connected between the output of the shift register and the intermediate points of the voltage divider bridges are arranged to be conductive and to inhibit the voltage at the intermediate point when the logic state at the output of the register is a high state corresponding to the presence of a voltage, whereas for the other logic state, or low state, the electrical connection means are blocked and the electrical voltage at the intermediate point is maintained.

These electrical connection means can comprise for each output of the shift register a transistor, particularly of NPN type, connected appropriately as is explained herebelow.

The shift register acts moreover as a memory since it stores at its output the logic states.

This second embodiment of the control device is more particularly intended to operate with outside information sent by radio-beacons, either in the form of periodical square wave pulses of variable duration, or in the form of a definite number of cyclically emitted pulses; the device is then arranged so as to establish the speed limit by using a complete group of information received by the vehicle, this group coming after the first group of information received by the vehicle when it enters the field of information emission; the complete group of information used for establishing the speed limit is particularly formed by the second group of information received by the vehicle, the information received after this complete group being inhibited.

For this the control device can comprise a first monostable circuit which can be re-triggered and which can be combined with a second monostable circuit, as explained in more detail herebelow.

Still in the second embodiment, coding means can be provided more particularly appropriate for the type of outside information according to whether it is contained in a cyclically emitted square pulse, or in the frequency of a train of pulses, or in a number of cyclically emitted pulses. The details of these coding means will be explained hereinafter.

The invention consists, apart from the arrangements exposed above, of certain other arrangements which will be more explicitly mentioned hereafter in the embodiments described with reference to the accompanying drawings, but which are in no way limiting.

FIG. 1 of these drawings is a block diagram of a device according to a first embodiment of the invention.

FIG. 8 is a general table showing the coding of the different speeds in the left-hand part, and, in the right-hand part, the state of the intermediate points of the divider bridges.

FIG. 9 of these drawings is a simplified diagram of a second embodiment of the device for automatically controlling a speed restriction from information coming from outside.

FIG. 10 is a diagram of part of the circuits of a device according to FIG. 9.

FIG. 11 is a table explaining the coding of the speed limits.

FIG. 12 is a diagram of a device according to FIGS. 9 and 10, intended to operate with the information contained in the width of a square wave.

FIG. 13 illustrates the coding of information with the device of FIG. 12.

FIG. 14 is a table resuming the coding obtained according to FIG. 13.

FIG. 15 shows the signals at different points of the circuits of the device of FIG. 12.

FIG. 16 is a diagram of a device according to FIGS. 9 and 10 arranged to operate with information contained in the frequency of a train of pulses.

FIG. 17 illustrates the coding of the speeds with the device of FIG. 16.

FIG. 18 is a table resuming the coding obtained with FIG. 17, identical to the table of FIG. 14.

FIG. 19 is a diagram of a device according to FIGS. 9 and 10 arranged to operate with information contained in a number of cyclically emitted pulses.

FIG. 20 shows the signals at different points of the circuit of FIG. 19.

FIG. 21, finally, is a table showing the coding of the speeds identical to that of FIGS. 14 and 18, obtained with the device of FIG. 19.

Figure 1:
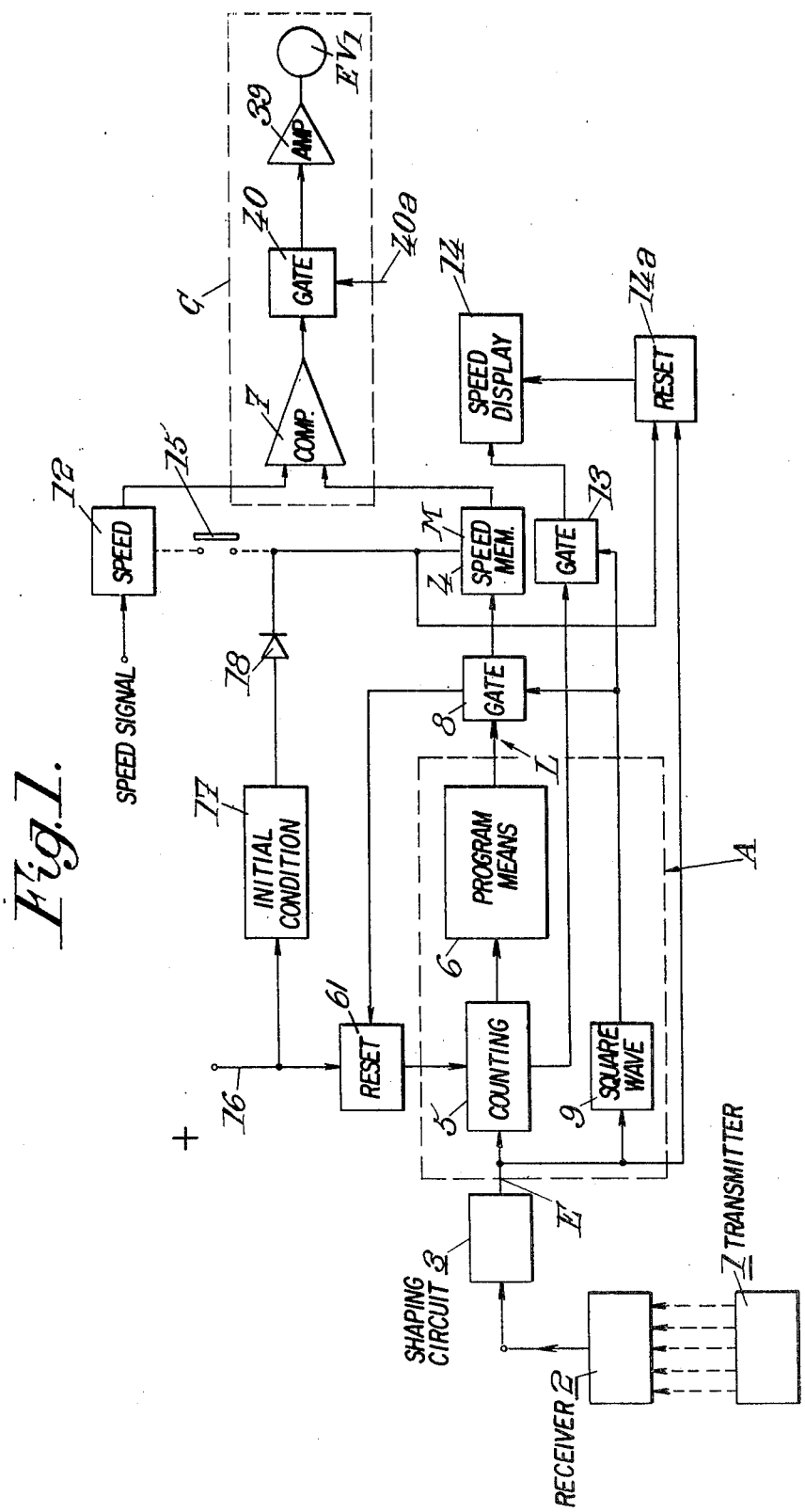

Referring to FIG. 1 there is shown the general layout of a device for automatically controlling a restriction of the speed of a motor vehicle travelling along a stretch of road subjected to a speed restriction, from information coming from outside.

The information comes from a transmitter 1 located outside the motor vehicle. This transmitter can be formed by radio-beacons fixed in position, or by metal or magnetic strips forming part of the road or by any other equivalent transmission means. The information is received in the form of pulses.

A sensor or receiver 2, able to pick up the information coming from transmitter 1, is mounted in the vehicle. The information picked up by sensor 2 is then sent to a conventional shaping circuit 3 so as to obtain pulses i having a very definite shape, e.g. the rectangular shape shown on the first line of FIG. 4.

The thus shaped pulses are sent to the input E of the device of the invention for the automatic control of the speed restriction of the vehicle.

This device comprises:
pulse analysis and decoding means A able to make a determined value of the speed limit correspond to a determined number of pulses, so that with each speed limit value there is associated a different number of pulses;
memory means M for storing the speed limit value for the stretch of road concerned;
and control means C for controlling the speed of the vehicle, responsive to the value of the speed limit stored in the memory.

The pulse decoding and analysis means are advantageously formed by converter means for converting the number of pulses into an electric voltage representing the speed limit, the value of this electric voltage depending on the number of pulses. The memory means M comprise then a condensor 4 (FIG. 7) able to store the value of this electric voltage.

The decoding and analysis means A comprise;
means 5 for counting the number of pulses and for coding the speed limit corresponding to the number of pulses counted;
program means 6 for providing, for each speed limit, an electrical voltage associated with this speed;
electrical connection means L (FIG. 7), responsive to the coding of the speed limit, between the program means 6 and an input of the memory means.

The control means C comprise comparator means 7, an input of which is connected to memory 4.

The electrical connection means L comprise a gate 8 (FIG. 1) whose opening is enabled after the appearance of the first pulse i. The time interval Δt (FIG. 6) between the appearance of the first pulse and the opening of gate 8 is sufficiently long to be always greater than the longest time for counting the maximum number of pulses.

Figures 5, 6:
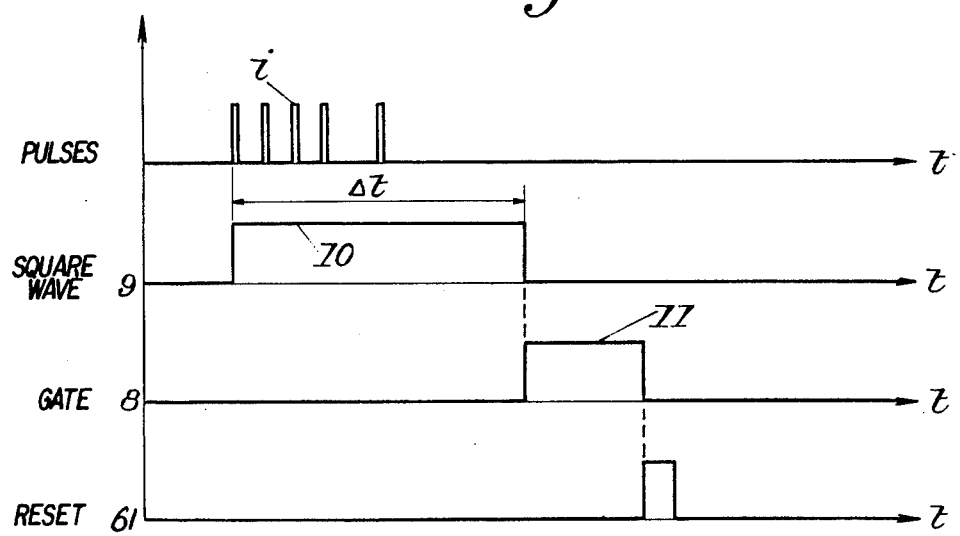
FIG. 5 is a table showing the coding of the speeds.
FIG. 6 is a time diagram relative:
to the control pulses shown on the upper line;
to the switching square wave of the monostable circuit;
to the opening of the gate controlled by the monostable; and
to the resetting of the counting circuit.

The control of the opening of gate 8 is provided by a monostable circuit or "square wave circuit" 9 whose input is connected to the output of shaping circuit 3, as can be seen in FIG. 1. The output of monostable circuit 9 is connected to the control for opening gate 8. This monostable circuit 9 generates a square wave 10 (FIG. 6). As can be seen in this FIG. 6, the switching of the monostable circuit 9 is controlled by the rising front of the first pulse i coming from the outside transmitter; the return of the monostable circuit to its rest state takes place after the time interval Δt which is a characteristic of the monostable.

The return of the monostable to its rest state controls the opening of gate 8 as shown on the third line of FIG. 6 by signal 11.

This gate 8 is formed by a monostable circuit which comes back to its initial state, corresponding to the closing of the gate, at the end of a determined time after the opening of the gate.

As shown in FIG. 1, an output of gate 8 is connected to the resetting circuit 61 of the counting and coding means 5, so that the opening of gate 8 controls the resetting of means 5.

It appears immediately, from FIG. 1, that the pulses shaped by circuit 3 drive the input of the counting-coding means, or circuit, 5. This counting-coding circuit is connected to the input of speed program means or circuit 6. The output of this speed program means 6 is connected through gate 8 to memory 4. This memory is connected to one of the inputs of comparator 7.

Another input of this comparator 7 receives, coming from a circuit 12, a signal representing the effective speed of the vehicle. Circuit 12 is arranged to shape a speed signal coming from a conventional speed sensor, e.g. an electromagnetic sensor.

An output of the counting-coding circuit 5 is connected, through a gate 13 (FIG. 1) to a speed limit display device 14. This device 14 enables the driver to read directly the speed limit for the stretch of road considered. The display on device 14 is facilitated by the fact that the number, at the output of the counting-coding circuit 5, is binary coded.

The output of the square wave circuit 9 is connected to a control terminal for opening gate 13. This opening is also controlled by the end of square wave 10 produced by circuit 9. Gate 13 is also formed by a monostable circuit and recloses a definite time after its opening. The closing of gate 13 takes place before or, at latest, at the same time as that of gate 8; in fact, the resetting of counting means 5 by the closing of gate 8 must not influence the display device 14.

The output of shaping circuit 3 is connected to an input of resetting circuit 14a of display device 14 so that the appearance of the first pulse, at the output of circuit 3, controls the resetting of display device 14.

An electrical connection, fitted with a manual contact 15, normally open, is provided between an output of the speed circuit 12 and, on the one hand, an input of memory 4 and, on the other, an input of resetting circuit 14a. By pressing contact 15, so as to close the electrical connection, there is introduced into memory 4 an electrical voltage corresponding to the speed signal produced by circuit 12, which speed signal corresponds to the instantaneous speed of the vehicle at the moment when contact 15 is pressed. Simultaneously, the resetting of display device 14 is enabled by sending a signal to the input of circuit 14a.

The driver can thus store in the memory a speed which he has chosen particularly when he is travelling on a restricted road not equipped with transmitter 1.

A line 16, connected to an input of resetting circuit 61 of counting means 5, is provided. This line 16 is able to receive a signal when the ignition of the motor vehicle is switched on so that circuit 61 orders the resetting of counting means 5.

This line 16 is also connected to the input of an initial condition circuit 17 whose output is connected, through a diode 18, to the input of memory 4. Circuit 17 is able to supply at its output a voltage corresponding for example to the maximum speed of the vehicle, so that when the ignition is switched on in the vehicle, this maximum speed is introduced into memory 4 to facilitate starting the vehicle. The anode of diode 18 is connected to the output of circuit 17, whereas the cathode is connected to the input of memory M.

Figure 3:
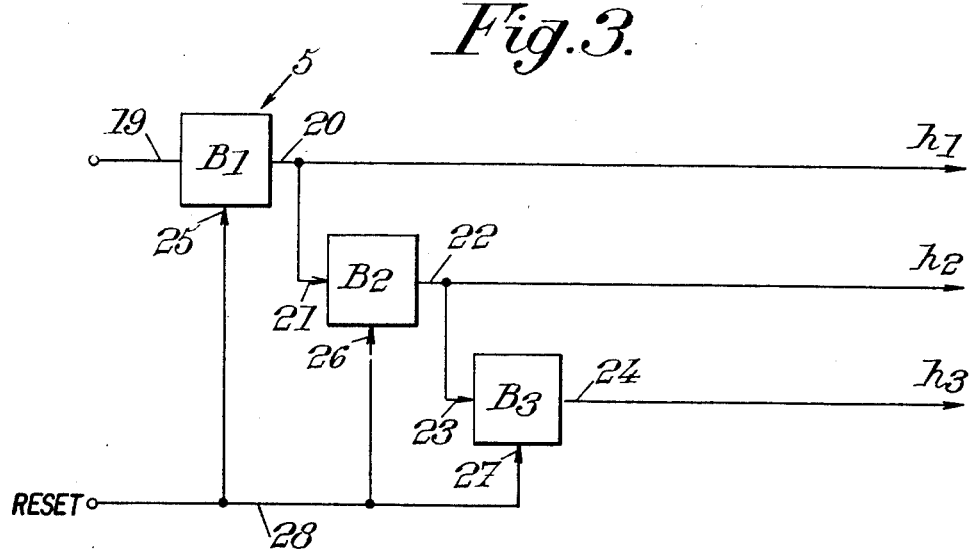
FIG. 3 is a diagram representing the connections of the flip-flops of the coding means.

The counting-coding means 5 comprise a succession of flip-flops $B_1$, $B_2$, $B_3$ . . . as shown in FIG. 3.

Figure 4:
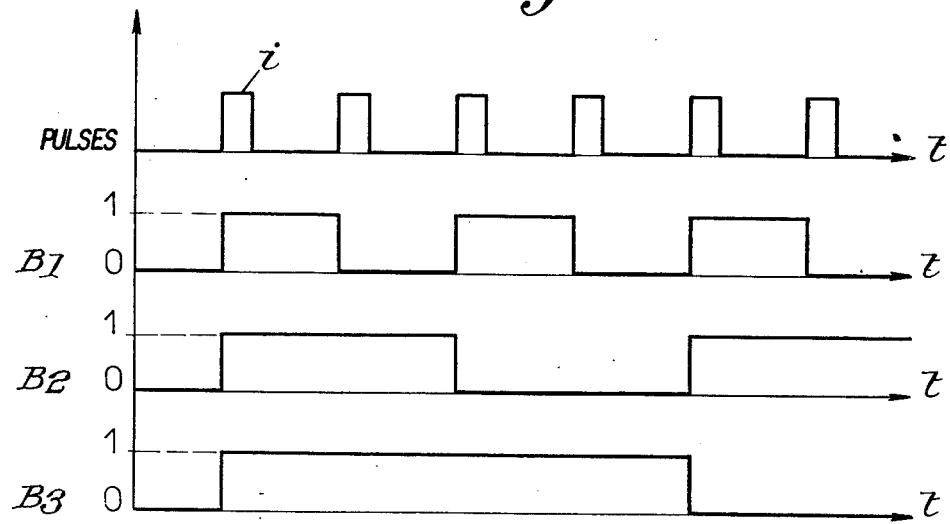
FIG. 4 shows the shaped pulses obtained from information coming from the outside and the signals obtained at the output of each flip-flop of FIG. 3.

Input 19 of the first flip-flop $B_1$ is connected to the output of the shaping circuit and is then driven by the pulses shown at the upper line of FIG. 4, corresponding to outside information. Output 20 of $B_1$ is connected in parallel with a first coding line $h_1$ and with input 21 of second flip-flop $B_2$.

The output 22 of the second flip-flop $B_2$ is connected in parallel with a second coding line $h_2$ and with the input 23 of the third flip-flop $B_3$.

This branching can be repeated as many times as necessary to obtain a number of coding lines sufficient for the whole of the information to be supplied.

In the present case only three flip-flops are used. The third flip-flop $B_3$ has its output 24 connected only to the third coding line $h_3$.

Flip-flops $B_1$, $B_2$, $B_3$ have inputs 25, 26 and 27 for resetting, all connected inparallel with a common line 28 able to receive a signal for resetting all the flip-flops.

FIG. 4 shows diagrammatically the coding obtained on lines $h_1$, $h_2$ and $h_3$ against time t shown on the x-axis.

The upper line of FIG. 4 shows a train of six pulses coming from the outside.

Flip-flops $B_1$, $B_2$ and $B_3$ are arranged to switch only when the signal at their input corresponds to a rising front.

The output of flip-flops $B_1$, $B_2$ and $B_3$ passes from level 0 to level 1 with the rising front of the first pulse i.

The output of flip-flop $B_1$ comes back to level 0 with the rising front of the second pulse i.

The output of flip-flop $B_2$ will only return to level 0 with the rising front of the second pulse at the output of flip-flop $B_1$.

The output of flip-flop $B_3$ will only return to level 0 with the rising front of the second pulse at the output of flip-flop $B_2$.

The table of FIG. 5 resumes the coding obtained on lines $h_1$, $h_2$, $h_3$ for a number of pulses i going from 1 to 6.

When a single pulse i is present, the outputs of flip-flops $B_1$, $B_2$, $B_3$ and coding lines $h_1$, $h_2$, $h_3$ are at level 1.

For two pulses, line $h_1$ is at level 0 whereas lines $h_2$ and $h_3$ are at level 1.

The reading of the rest of the table of FIG. 5 is evident.

To the different codings thus provided on lines $h_1$, $h_2$, $h_3$ are made to correspond definite speed limits. For example, as shown in the right-hand column of the table of FIG. 5, to the code 111 corresponds the speed of 130 kph; to coding 011 corresponds the speed of 110 kph and so on.

Figure 7:
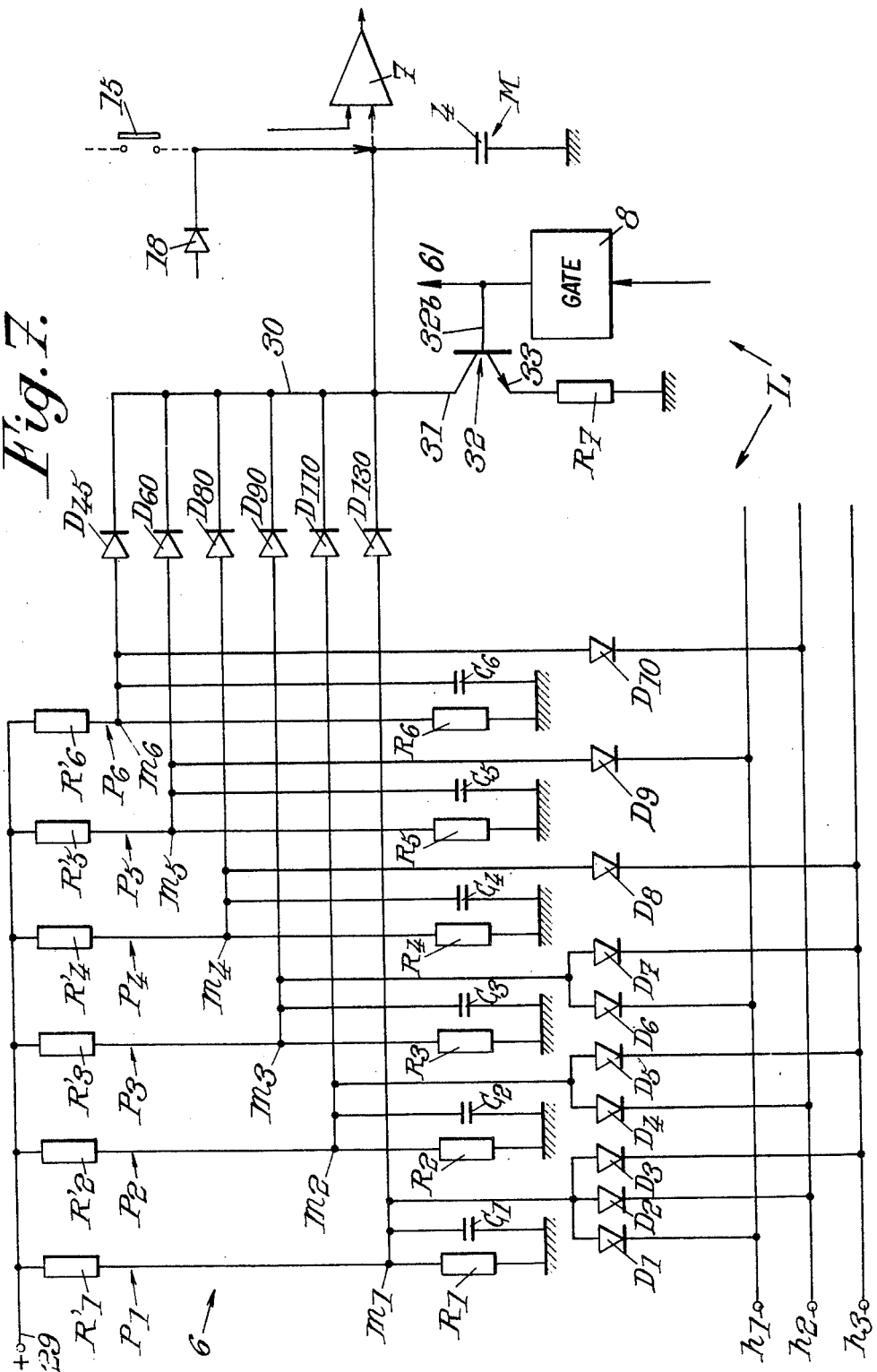
FIG. 7 is a circuit diagram of the speed program circuit.

Referring to FIG. 7, it can be seen that program means 6 comprise voltage divider bridges $P_1$, $P_2$, $P_3$, $P_4$, $P_5$, $P_6$. The number of these divider bridges is at least equal to the number of speed limits. In the present case, as shown in FIG. 5, six speed limits are provided so that at least six divider bridges $P_1$ to $P_6$ are provided.

These bridges are connected in parallel between a supply line 29 connected to the positive terminal of a DC voltage source and ground.

Each bridge comprises two resistors connected in series betweeen line 29 and ground, and an intermediate point.

For bridge $P_1$, the resistors have been designated by $R_1$ and $R'_1$ and the intermediate point by $m_1$.

For bridges $P_2 \ldots P_6$, the resistors and the intermediate points have been designated by the same letters as for $P_1$ followed by the reference number 2 ... 6.

A capacitor $C_1$, $C_2 \ldots C_6$, whose role will be explained later on, is connected between each intermediate point corresponding to the index of the capacitor and ground.

Each intermediate point $m_1 \ldots m_6$ is connected to a common line 30 through a diode $D_{130}$, $D_{110}$, $D_{90}$, $D_{80}$, $D_{60}$, $D_{45}$.

The indexes 130 ... to 45 of diodes D correspond to the numerical values of different speed limits selected in the chosen embodiment and shown in the right-hand column of the table of FIG. 5.

It thus appears that bridges $P_1$ to $P_6$ are associated with different speed limits classed in decreasing order.

The electrical voltages normally obtained at points $m_1 \ldots m_6$, when these points are not directly connected to ground, have decreasing numerical values corresponding to decreasing speed limits 130 kph ... 45 kph. (kph=kilometer per hour).

The anode of each diode $D_{130} \ldots D_{45}$ is connected to intermediate point $m_1$ whereas the cathode is connected to line 30. This line 30 is connected to a plate of capacitor 4. The other plate of capacitor 4 is connected to ground.

Line 30 is also connected to the collector 31 of a transistor 32 of NPN type. The emitter 33 of the transistor is connected to ground through an adjusting resistor $R_7$. The output of gate 8 (FIGS. 1 and 7) is connected to the base 32b of transistor 32, this base being itself connected to the input of resetting circuit 61 (FIG. 1).

The electrical connection means L between each intermediate point $m_1 \ldots m_6$ and coding lines $h_1$, $h_2$, $h_3$ comprise diodes $D_1 \ldots D_{10}$ connected so that the voltage at the intermediate point of a divider bridge is available on line 30 when the coding appearing on lines $h_1$, $h_2$, $h_3$ corresponds to the speed limit associated with the divider bridge.

Level 1 of a coding line $h_1$, $h_2$, $h_3$ corresponds to the presence of the positive voltage on the coding line whereas level 0 corresponds to the grounding of this coding line.

The anodes of diodes $D_1 \ldots D_{10}$ are respectively connected to intermediate points $m_1 \ldots m_6$ whereas the cathodes are connected to the coding lines.

Therefore, when a coding line displays level 0, the intermediate point $m_1 \ldots m_6$ connected to this coding line by a diode will be substantially at zero voltage.

Diodes $D_1$ to $D_{10}$ are advantageously connected so that the voltage at intermediate point $m_1 \ldots m_6$ of a divider bridge is systematically inhibited only when this voltage is higher than that corresponding to the speed limit appearing on the coding line.

In other words, if the coding lines $h_1$, $h_2$, $h_3$ indicate speed limit 90 kph by coding 1.0.1. (see FIG. 5), the voltage at the intermediate points $m_1$, $m_2$ of the divider bridges associated with speeds 130 kph and 110 kph, giving normally a voltage higher than that of intermediate point $m_3$ associated with the speed 90 kph, must be inhibited.

The voltages at points $m_4$, $m_5$ cannot be inhibited. In fact, the normal voltage at point $m_3$ being higher than the voltages of points $m_4$, $m_5$, diodes $D_{80}$, $D_{60}$ will have at their anode a voltage lower than that appearing at their cathode and will act as a barrier so that the lower voltage of points $m_4$, $m_5$ will not have any adverse influence.

Point $m_6$ is at zero voltage.

From such branching results the fact that in the right-hand part (intermediate points) of the table of FIG. 8, the squares located above the diagonal 1 ... 1, can contain levels 1 and levels 0 which provides for simplification and reduction of the number of diodes $D_1$ to $D_{10}$.

Diodes $D_1$, $D_2$, $D_3$ are connected in parallel between intermediate point $m_1$ and the three coding lines $h_1$, $h_2$, $h_3$.

Diodes $D_4$ and $D_5$ are connected in parallel between intermediate point $m_2$ and coding lines $h_2$, $h_3$.

Diodes $D_6$, $D_7$ are connected in parallel between intermediate point $m_3$ and lines $h_1$ and $h_3$.

Diode $D_8$ is connected between intermediate point $m_4$ and line $h_3$.

Diode $D_9$ is connected between point $m_5$ and line $h_1$.

Diode 10 finally is connected between intermediate point $m_6$ and line $h_2$.

The different dividers $P_1 \ldots P_6$ provide a voltage higher than that representing the associated speed limit so that when transistor 32 is enabled, the end value of the voltage is adjusted by the contribution of resistor $R_7$ which is connected in parallel with the divider bridge.

The table of FIG. 8 resumes the coding of the speed limits, from a number of pulses, and the decoding of these speeds by the program means 6.

The first column of the table of FIG. 8 shows the number of pulses supplied from the outside. The second column shows the speed limits (arbitrary) corresponding to each number of pulses, expressed in kilometers per hour; columns $B_1$, $B_2$, $B_3$ show respectively the state of the output of each flip-flop $B_1$, $B_2$, $B_3$; level 1 corresponds to the presence of the positive voltage, level 0 corresponds to connection to ground.

Columns $m_1 \ldots m_6$ show the presence of a voltage at an intermediate point $m_1 \ldots m_6$, when the corresponding square comprises the figure 1; when the square comprises the figure 0, that means that the voltage at the intermediate point $m_1$ is inhibited by grounding of this point.

A numerical example will make for a better understanding of FIG. 7 and the table of FIG. 8.

Let us suppose for example that sensor 2 receives a train of three pulses which corresponds to a speed restriction of 90 kph.

The pulses arrive at the counting flip-flops $B_1$, $B_2$, $B_3$ and coding lines $h_1$, $h_2$, $h_3$ are at levels 101 as results from FIG. 5 and as can be seen on the left-hand part of the table of FIG. 8, on the 90 kph line.

Since line $h_1$ is at level 1, it is at the voltage of the positive terminal; since line $h_2$ is at level 0 it is at ground potential whereas, since line $h_3$ is at level 1 it is also at the potential of the positive supply terminal.

Diode $D_2$ provides a connection between intermediate point $m_1$ and line $h_2$ at ground potential so that point $m_1$ is also at ground potential and the electrical voltage corresponding to the speed of 130 kph is inhibited. That is expressed in the right-hand part of the table of FIG.

8, in the line corresponding to three pulses, by the figure 0 appearing in the square of the $m_1$ column.

The same goes for intermediate point $m_2$ connected by diode $D_4$ to line $h_2$.

On the other hand, intermediate points $m_3$, $m_4$, $m_5$ which are not connected to line $h_2$ will be at a voltage corresponding (except for the adjustment supplied by the resistor $R_7$) to speed limits 90 kph, 80 kph and 60 kph.

The voltage at intermediate point $m_6$ is also inhibited or annulled by diode $D_{10}$ providing a connection with line $h_2$.

Thus the levels of intermediate points $m_1 \ldots m_6$, when the coding lines transmit the information corresponding to speed 90 kph are summarized by the number:

001110 which can be read in the third line of the right-hand part of the table of FIG. 8.

Since the electrical voltage of intermediate point $m_3$ is higher than that of points $m_4$ and $m_5$, diodes $D_{80}$ and $D_{60}$ form a barrier and oppose a lowering of the voltage at intermediate point $m_3$.

When gate 8 opens, transistor 32 is enabled and connects the channel corresponding to diode $D_{90}$ to resistor $R_7$. The exact voltage corresponding to the speed 90 kph is obtained by the divider bridge formed by resistors $R'_3$, $R_3$ and diode $D_{90}$, transistor 32 and resistor $R_7$ connected in parallel to resistor $R_3$.

The "reference speed" voltage stored in capacitor 4 is subjected to the voltage of the collector 31 of transistor 32, as long as the latter is enabled, so that it is possible to increase or decrease the "reference speed" and therefore the speed reference.

When gate 8 closes, transistor 32 is disabled and resetting circuit 61 resets the three flip-flops $B_1$, $B_2$, $B_3$, which cancels or inhibits the voltage at all intermediate points $m_1 \ldots m_6$. Capacitor 4 is then isolated, all the diodes $D_{45}$ to $D_{130}$ being taken in the reverse direction and transistor 32 being disabled.

Capacitors $C_1$ to $C_6$ connected in parallel with resistors $R_1$ to $R_6$ allow the building up of voltages at intermediate points $m_1$ to $m_6$ to be judiciously delayed during the counting phase, gate 8 being closed, so that the voltages are only established when all the pulses coming from the outside have been counted.

We can again consider, as an example, the case where the outside information corresponds to three pulses, i.e. a speed limit of 90 kph.

The first pulse will cause all the flip-flops to be at level 1 and so all coding lines $h_1$, $h_2$, $h_3$ at level 1.

In the absence of capacitors $C_1$ and $C_2$, intermediate points $m_1$ and $m_2$ would immediately assume the voltage determined by divider bridges $P_1$ and $P_2$, which would result in an excessive modification of the voltage of capacitor 4.

The second pulse will cause coding line $h_1$ to assume level 0 but lines $h_2$ and $h_3$ will remain at level 1 and intermediate point $m_2$ will still have power on.

It is only after the third pulse that the coding of lines $h_1$, $h_2$, $h_3$ will be correct and that the voltage corresponding to the speed 90 kph will be applied to capacitor 4.

Capacitors $C_1$, $C_2 \ldots C_6$ serve then to avoid a modification of the voltage of capacitor 4, which forms a memory, before the counting of all the pulses coming from outside has been completed.

The control means C of the internal combustion engine of vehicle 7 are of the kind described and claimed in French patent application No. 7523038 filed by the applicant on July 23, 1975 to which corresponds U.S. patent application 704,757 filed July, 12, 1976.

Figure 2:
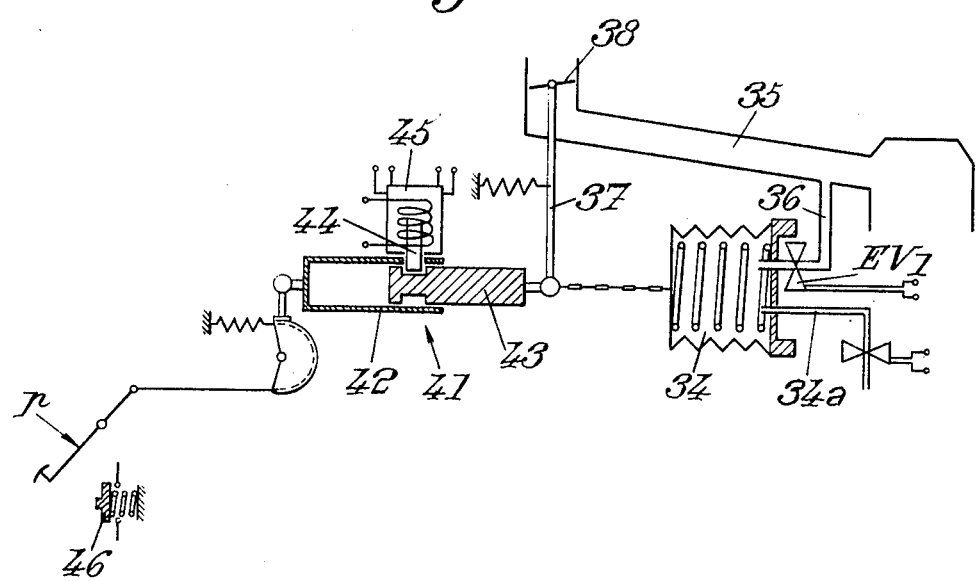
FIG. 2 shows one example of an embodiment of a control means for controlling the speed of the vehicle.

They are reviewed briefly with reference to FIGS. 1 and 2. These means may comprise a pneumatic jack 34 responsive to the partial vacuum in the inlet manifold 35 of the engine. This jack 34 has its chamber connected by piping 36 to said manifold 35. An electromagnetic valve $EV_1$ controls the opening or the closing of piping 36.

The pneumatic jack 34 is able to act on a lever 37 controlling the opening of throttling member 38 of manifold 35.

The control of electromagnetic valve $EV_1$ is achieved by means of output signals from an amplifier 39 whose input receives, through a gate 40, the output signals of comparator 7 (see FIG. 1).

A bleed 34a is provided to communicate jack 34 with the atmosphere. This bleed can be controlled by an electromagnetic valve.

When the effective speed (circuit 12) is greater than the reference speed of memory 4, the comparator 7 and amplifier 39 cause the opening of electromagnetic valve $EV_1$ so that the pneumatic jack 34 causes the closing of throttle valve 38 and a slowing down of the vehicle (bleeding of jack 34 to the atmosphere).

Conversely, when the effective speed of the vehicle (circuit 12) is less than that stored in the memory, amplifier 39 causes the opening of electromagnetic valve $EV_1$ and the admission of the partial vacuum into jack 34, so that throttle valve 38 opens which allows the engine to accelerate.

Connecting means 41 (FIG. 2) between the control pedal p for opening throttle member 38 and this throttle member are arranged so as to have a substantially constant effective length when the automatic control of the speed restriction is not engaged and to have a variable length when this automatic control is engaged.

For example, these means can be formed by a telescopic link comprising a cylinder 42 connected to accelerator pedal p in which can slide a piston 43 connected to lever 37. When the automatic control is not engaged, piston 43 is locked, relative to cylinder 42, by the core 44 of an electro-magnet 45. When the automatic speed control is engaged, electro-magnet 45 causes the unlocking of the telescopic link by disengaging core 44 from a groove provided in piston 43.

When piston 43 is unlocked relative to cylinder 42, the driver can maintain the accelerator pedal completely pressed down against a kick-down 46 equipped with an electrical contact. When the kick-down is operated this contact brings about the suppression of the automatic speed restriction control as explained in French patent application No. 75 23038 filed on July 23, 1975 by the applicant (or U.S. patent application 704,757 filed July 12, 1976).

According to a variation, the variable length connecting means between the accelerator pedal p and throttle member 38 could be constituted by the pneumatic jack 34, itself disposed in these connecting means (see particularly FIG. 25 of French patent application No. 75 23038) or by flexible means winding along a twisting path whose length can be modified by displacing one or more points of this twisting path.

The engagement of the speed restriction automatic control is obtained by causing gate 40 (FIG. 1) to open by applying to an input 40a of this gate an opening control signal at the moment of engagement.

This engagement signal is triggered off, particularly at the closing of gate 8, after a new reference speed has been transferred into memory 4.

This being the case, the operation of the device of the invention is as follows.

When the vehicle reaches a stretch of road with a speed restriction, sensor 2 receives from transmitter 1 (FIG. 1) data whose number depends on the value of the speed limit. This information is supplied for example by magnetic strips fixed in the road and whose number varies according to the information to be transmitted.

The shaped pulses, at the output of circuit 3, drive the counting-coding means 5 and square wave generator 9.

Counting-coding means 5 and program means 6 act in combination to select the voltage which is to appear on line 30 (FIG. 7) in correspondence with the speed restriction information.

When signal 10 (FIG. 6) of square wave circuit 9 ceases, gate 8 opens and allows to be transferred into memory 4 the voltage corresponding to the speed limit. Gate 13 also opens and causes device 14 to display the speed limit. This device 14 had been previously reset by the first pulse coming from circuit 3, by means of circuit 14a.

Gate 8 closes again, after a definite time (end of signal 11 of FIG. 6), which causes the resetting of counting circuit 5 by means of circuit 61.

Gate 13 also closes again, at the latest at the same time as gate 8.

The closing of gate 8 is used to cause the opening of gate 40 and the bringing into use of the automatic speed restriction control.

The electromagnetic valve $EV_1$ controlled by amplifier 39, from comparator means 7, causes, through pneumatic jack 34, the speed of the vehicle to be automatically maintained at the limit value.

When the automatic control operates, the driver is driving with pedal p bearing against the kick-down 46.

When the driver operates the kick-down 46, an electrical contact causes the automatic speed control to be cancelled so that the driver can use, in case of necessity, the full power of the vehicle.

It is to be noted that the resetting of counting-coding means 5 is achieved with the closing of gates 8 and 13 so that this resetting is without influence on the memory 4 and the display device 14.

There can be provided, at the end of the stretch of road with a speed restriction, the transmission of information formed by a number of pulses so that the end of the speed restriction is automatically controlled by the device.

The speed displayed in device 14 is stored until the arrival of a new train of pulses corresponding to speed information which causes the resetting then the up-dating of the displayed speed.

If the driver of the vehicle wishes to use the automatic control on a road which is not equipped with transmitter 1, it is sufficient for him to operate the manual control formed by contact 15 at the moment when the vehicle is travelling at the speed that the driver wishes to maintain.

This operating of contact 15 causes the resetting of the display of the speed limit by device 14. A new speed will then be displayed in this device only when the vehicle meets a new transmitter 1. Thus, on roads without a sub-structure, no speed limit will be displayed.

The driver will know that it is up to him to respect the speed limit information supplied by the notice boards located at the side of the road. As soon as the vehicle enters a road with a sub-structure having a transmitter 1, the automatic control will operate and the speed imposed will be permanently displayed by device 14.

Thus the driver knows whether the automatic speed restriction control results from information coming from the outside or not. In the first case, in fact, there is always a speed displayed; on leaving a road with automatic control, the first time that the manual control 15 is operated will reset the display of the speedlimit by device 14.

There can be provided in the sub-structure of the road, a resetting control for the display device 14 at the end of the stretch of road equipped with a speed restriction information transmitter 1.

The invention provides then, with a relatively simple device, an automatic speed control for a motor vehicle whatever the speed limit of the stretch of road considered.

The outside information can be supplied to the vehicle in an extremely simple and complete way by sending to the vehicle a definite number of pulses corresponding to the desired speed limit or to the desired information (end of speed limit etc . . .).

This number of pulses can be obtained by placing in the road transversal plates whose number is in relation to the speed value. The distance between these plates can be chosen arbitrarily. All the vehicles crossing these plates will receive the information about the speed limit whatever the speed at which the vehicles cross these plates. It is sufficient to provide a signal 10 supplied by circuit 9 sufficiently long for all the pulses to be counted even if the vehicle is travelling slowly, at a speed below the speedlimit, e.g. at 45 kph.

The speed limit information can be supplied only at the entry to the stretch of road; the device of the invention will provide the automatic control, during the whole stretch of road subject to the speed restriction, through memory means 4.

It is to be noted that in case of a change of the numerical value of a speed limit, all that is necessary is to adjust the corresponding divider bridge of FIG. 7, without having to modify the transmitter 1, i.e. without having to modify the sub-structure of the road.

For example, if the upper speed limit is lowered from 130 kph to 115 kph all that will be necessary will be to modify the single resistor $R_1$ of bridge $P_1$. The rest of the device and especially the sub-structure of the road will be maintained without change. The stretches of road whose speed limit was 130 kph before the change will thus automatically be limited to 115 kph.

It is clear that the particular means provided in the embodiment described can be replaced by equivalent means. In particular, logic states 1 of the embodiment described correspond to the presence of a positive voltage; the unit could obviously operate if logic states 1 corresponded to the presence of a negative voltage with connections and circuits adapted to such a negative logic.

The device of the invention is particularly suitable for motor vehicles but can be adapted to other types of vehicle, particularly to vehicles travelling on rails.

A second embodiment will now be described with reference to FIGS. 9 to 21.

Referring to FIG. 9, there can be seen a simplified diagram of a control device. This device comprises a sensor 2a carried on board a vehicle and intended for picking up outside information relative to the speed restriction. Means 5a are provided for coding the information received by 2a.

The information thus coded is sent to speed program means 6a able to supply, at their output, a voltage corresponding to the speed restriction. Speed control means C, responsive to the voltage at the output of 6a, are able to maintain the vehicle at the indicated speed.

Means C can comprise a comparator circuit for comparing the voltage, corresponding to the speed limit, with a voltage signal corresponding to the effective speed of the vehicle; the output of the comparator is connected to control means of the kind described and claimed in French patent application No. 75 23038 filed on July 23, 1975 already mentioned.

The device of FIGS. 9 to 21 concerns more particularly the case where the outside information is supplied by radio beacons placed at the side of the roadway and which transmit permanently information representing the speed limit for a stretch of road considered.

Coding means 5a are adapted to the type of information supplied from the outside and will be described hereafter according to the type of information used. However, whatever this type of information, means 5a comprise a shift register S (FIG. 10) which has n outputs; in the particular examples described with reference to the drawings n is equal to 4. For simplicity's sake, in the rest of the description, mention will no longer be made to n or n+1 but simply to the numbers 4 and 5, it being understood that the invention applies whatever the number n.

The 4 parallel outputs of this register S are designated by $S_a$, $S_b$, $S_c$, $S_d$.

Program means 6a comprise, as shown in FIG. 10, five voltage divider bridges $P_1 \ldots P_5$ each of which has an intermediate point $m_1 \ldots m_5$ between a constant voltage source connected to the common supply line 29 and ground. It is clear that, for each bridge, electrical resistors are disposed between each intermediate point and respectively the constant voltage source and ground; the position of the intermediate points is adjustable (potentiometer) for adjusting the voltage.

To each voltage available at an intermediate point, there is made to correspond a speed limit, e.g. for points $m_1$ to $m_5$ the following speed limits: 130 kph, 110 kph, 90 kph, 80 kph, 60 kph. The voltages at points $m_1 \ldots m_5$ are advantageously chosen so that they have decreasing values like the speed limits associated with these different points.

As can be seen in FIG. 10, each intermediate point $m_1 \ldots m_5$ is connected to the anode of a diode D130, D110, D90, D80, D60. The cathodes of these diodes are connected to a common line 30a.

It can be seen that diodes D130 . . . are connected so that they let appear on common line 30a the largest of the voltages appearing at the intermediate points. Only the diode connected to the intermediate point whose voltage will be the highest will operate in the passing direction; the other diodes will cause the high voltage to be blocked since their cathode will be at a higher voltage than the anode.

It appears immediately that, so as to obtain on line 30a a voltage lower than that corresponding to the highest of the speed limits, e.g. to obtain the voltage of point $m_3$ (90 kph) it will be necessary to suppress or inhibit the voltages higher than that of point $m_3$, i.e. it will be necessary to inhibit the voltages at points $m_2$ and $m_1$. This inhibition will be obtained, as is explained hereafter in more detail, by connecting points $m_2$ and $m_1$ to ground.

Electrical connection means $L_a$ are provided between, on the one hand, the four intermediate points $m_1 \ldots m_4$ whose voltage is normally higher than that of intermediate point $m_5$ having the lowest voltage and, on the other hand, the four outputs $S_a \ldots S_d$ of shift register S.

The electrical connection means $L_a$ are responsive to the logic states of the outputs of register S and are such that for a determined logic state the voltage at the associated intermediate point $m_1 \ldots m_4$ at the output is substantially suppressed.

Advantageously, the electrical connection means $L_a$ comprise transistors $T_a$, $T_b$, $T_c$, $T_d$ associated respectively with each output $S_a \ldots S_d$ of the shift register. These transistors are of the NPN type. Their collector, as can be seen from FIG. 10, is connected directly to intermediate point $m_1$ for $T_a$, $m_2$ for $T_b$, $m_3$ for $T_c$ and $m_4$ for $T_d$.

The emitter of each transistor is connected to ground.

The base of each transistor $T_a \ldots T_d$ is connected respectively to outputs $S_a \ldots S_d$ through an appropriate electrical resistor.

Therefore, when the logic state of one output $S_a \ldots S_d$ corresponds to the presence of a positive voltage (this logic state is conventionally designated by level 1), the associated transistor will be enabled and the corresponding intermediate point $m_1 \ldots m_4$ will then be directly connected to ground; the voltage at this intermediate point will be substantially suppressed, so inhibited.

When the logic state of one output $S_a \ldots S_d$ corresponds to the absence of a voltage (conventionally level 0), the associated transistor is disabled so that the corresponding intermediate point is isolated from ground and is at its normal voltage.

The explanations and remarks which have preceded show how a voltage of one intermediate point can be inhibited to give priority to the voltage of another intermediate point which normally is lower. It will be noted that the lowest voltage of intermediate point $m_5$ never needs to be inhibited and four transistors are sufficient for a five speed limit program.

The table of FIG. 11 summarises the countings of the different speed limits.

The left-hand part of FIG. 11 comprises 5 lines, each line indicates the logic states of outputs $S_a \ldots S_d$ allowing a certain speed limit to be selected. The value of the selected speed limit is that of the preponderant speed path (i.e. of the electrical line forming the connection between an intermediate point $m_1 \ldots m_5$ and a diode).

In the right-hand part of FIG. 11, five columns have been indicated corresponding to the five speed limits 130 kph . . . 60 kph. In each column a letter p has been placed at the intersection of the column with the line indicating the coding which ensures the preponderance of the speed limit in question.

It is thus clear that for the first line in the left-hand part of the table, where all the outputs $S_a \ldots S_d$ are at level 0, the selected speed is 130 kph. In fact, since all the outputs are at level 0, all transistors $T_a \ldots T_d$ are disabled and the highest voltage of point $m_1$ corresponding to the speed 130 kph appears on line 30a.

On the other hand, for the third line of the left-hand part of the table, it can be seen that the outputs $S_a$ and $S_b$ are at level 1 whereas the outputs $S_c$ and $S_d$ are at level 0. The right-hand part of the table shows that the speed 90 kph is selected. In fact, transistors $T_a$ and $T_b$ whose bases are connected respectively to outputs $S_a$ and $S_b$ are conductive so that the voltages at points $m_1$ and $m_2$ are inhibited; this inhibition is indicated in the right-hand part of the table of FIG. 11 by letters i.

The shift register S which will be described in more detail later on provides a very simple coding and selection of the appropriate speed limit. The construction of the electrical connection means $L_a$ by four transistors is also very simple.

The outside information can be supplied to the speed control device in different forms from an all or nothing signal.

First of all the information can be contained in the width of an emission square wave. FIGS. 12 to 15 concern this first possibility.

In FIG. 12 there is shown diagrammatically sensor 2a supplying at its output, when it is in the emission field of the radio beacons, signals in the form of rectangular waves k corresponding to the information. A signal has been shown diagrammatically in FIG. 12; the first line of FIG. 15 shows these signals in relation to time.

In this example, the beacon can transmit five different square wave widths $T_1 \ldots T_5$ corresponding to the five possible speed limits. For example, for the speed limit 60 kph, the beacon will transmit a rectangular wave having the greatest width $t_5$. The decreasing widths $t_4$, $t_3$, $t_2$, $t_1$ correspond to the four other increasing speed limits.

The coding of square waves k according to their width and the storing of the code are achieved in the following way.

Four monostable circuits $M_{s1}$, $M_{s2}$, $M_{s3}$, $M_{s4}$ have their inputs connected in parallel with the output of sensor 2a so as to be driven by square wave k. The outputs of these monostable circuits are connected to four parallel inputs $E_a$, $E_b$, $E_c$, $E_d$ of the parallel shift register S. The four monostable circuits $M_{s1} \ldots$ are arranged to be triggered simultaneously by the rising front $k_m$ of square wave k.

As can be seen in FIG. 13, the duration of the switching of the four monostable circuits $M_{s1} \ldots M_{s4}$ comes between the five possible widths $t_1 \ldots t_5$ for the square wave k. It has been supposed in the representation of FIG. 13 that the state of rest of the four monostable circuits is the high logic level corresponding to a voltage at the output of the monostable circuit and shown by figure 1 whereas the switched state is the low level represented by figure 0.

The code is formed by the whole of the signals at the output of the monostable circuits $M_{s1} \ldots M_{s4}$. As can be seen from FIG. 13, the greater the width t of the square wave the more high levels 1 will be contained in this code.

The shorter of the square waves $t_1$ corresponds to a code of four 0. In the table of FIG. 14 there is summarised the codes corresponding to the different possible widths $t_1 \ldots t_5$. The code for each width is supplied by the succession of four figures of a column; these four figures correspond to the levels present on the different paths of inputs $E_a \ldots E_d$.

Shift register S comprises, in a conventional way, an input H intended to receive trigger signals for the clock of this register. This input H is connected to the output of sensor 2a through an OR gate $G_1$.

Register S is such that its clock is triggered by the descending front $k_d$ of the square wave, if gate $G_1$ is open. It is recalled that during the triggering phase of the clock of the register the logic states present at inputs $E_a \ldots E_d$ of the shift register are transferred and stored in outputs $S_a \ldots S_d$ associated with each input. This is a known characteristic of shift registers.

The control of gate $G_1$ is effected in such a way that the second square wave received by sensor 2a after the entry of the vehicle into the emission field of the radio beacon, is used to determine the speed limit; the following square waves k received by 2a are, on the other hand, inhibited.

To obtain this result, there is provided a first monostable circuit MsA whose input is directly connected to the output of sensor 2a; the output of this monostable circuit is connected, on the one hand, to a control terminal $g_A$ of gate $G_1$ and, on the other hand, to the input of a second monostable circuit MsB. The output of monostable circuit MsB is connected to another control terminal $g_B$ of gate $G_1$.

The monostable circuit MsA can be retriggered and its switching time is greater than the period of emission of square waves k; therefore, when the vehicle enters the emission field of the radio beacon, the reception of the first square wave k causes the switching of monostable circuit MsA and, before this monostable circuit MsA returns to its rest state, a new square wave k will have caused the retriggering of this monostable circuit. It is thus clear that monostable circuit MsA remains in its switched state during the whole time that the vehicle remains in the field of emission of the radio beacon. It is to be noted furthermore that monostable circuit MsA is triggered by the descending front $k_d$ of square wave k.

In FIG. 15 on the second line, there is shown the state at the output of the monostable circuit MsA. It can be seen that the output switches with the descending front of the first square wave k received. This output remains in the switched condition during the whole time of reception of square waves k. In the embodiment described, the rest state of monostable circuit MsA corresponds to the high level repesented by the figure 1 whereas the switched condition corresponds to the low level represented by the figure 0.

The switching of monostable circuit MsB is controlled by a descending front at the output of monostable circuit MsA. The switching time for monostable circuit MsB is higher than the period of emission of square waves k but is less than the time which separates the end of a first square wave k from the beginning of the third square wave. In other words, referring to the first line of FIG. 15, if it is considered that the switching of monostable circuit MsB takes place with the descending front of the first square wave k, the switching time of monostable MsB is such that it returns to its rest state in the interval j separating the end of the second square wave from the beginning of the third square wave.

There is shown, on the third line of FIG. 15, the state of the output of monostable circuit MsB. In the embodiment contemplated the rest state of this monostable circuit corresponds to a low level (figure 0) whereas the switched state corresponds to the high level (figure 1).

Gate $G_1$ is open if a level 1 is present at terminal $g_A$ or terminal $g_B$. Gate $G_1$ is, on the other hand, closed if the two terminals are at level 0.

The fourth line of FIG. 15 which represents the logic sum of the outputs of monostable circuits MsA and MsB summarises this situation. Gate $G_1$ which was open before the entry of the vehicle into the field of emission of the beacon, remains open until monostable MsB returns to its rest state. Gate $G_1$ then remains closed until the vehicle leaves the field of emission of the beacon, which causes the return of monostable circuit MsA to level 1.

Thus, the input H of the clock of register S will be able to be driven by the descending front $k_d$ of the first square wave and of the second square wave received by 2a. For the following square waves, since gate $G_1$ is closed, the clock of the register is inhibited.

The device comprises furthermore an initial condition circuit $C_0$ whose output is connected to a reset input RAZ of shift register S. This circuit $C_0$ is able to send a signal, causing the resetting of outputs $S_a \ldots S_d$, when, after the vehicle has stopped, the ignition contact of the vehicle is again switched on ready for starting up.

This resetting of the outputs of register S permits the display of the code formed by four noughts corresponding to the maximum speed limit, so that the driver is not subjected, when starting off, to a severe restriction.

The operation of the device of FIG. 12 is as follows.

OPERATION

When entering the field of emission of beacon, sensor 2a receives a first square wave k. This first square wave can only be received partially, as diagrammatically shown in the first line of FIG. 15, snce the beginning of the square wave has begun before sensor 2a enters the field of emission. The four monostable circuits Ms1 . . . Ms4 will send coded information to the inputs of register S based on the width of the first square wave. Gate $G_1$ is open. With the descending front $k_d$ of the first square wave k, a pulse is sent to input H of the clock and the code of the inputs is transferred immediately, and stored, at the outputs Sa . . . Sd of the register.

Since the vehicle has entered the field of emission of the beacon it is certain that the second square wave, shown on the first line of FIG. 15, will be completely received by 2a and will permit the speed limit to be correctly determined. This second square wave causes, by its rising front, km, a new switching of monostable circuits Ms1 . . . Ms4. There will be obtained, at the output of these circuits and at the inputs of register S the code corresponding to the exact width of square wave k and so to the exact speed limit.

Gate $G_1$ is still open. The descending front $k_d$ of this second square wave will then trigger once more the clock of register S which will cause the transfer of the code from inputs $E_a \ldots E_d$ to outputs $S_a \ldots Sd$.

Between the end of the second square wave and the beginning of the third, gate $G_1$ closes, as explained above, and remains closed until the vehicle leaves the field of emission of the beacon. The outputs of register S keep in store the code corresponding to the speed limit.

It is to be noted that if the device for inhibiting the clock of the register S formed by monostable circuits MsA and MsB were not provided, shift register S, when the vehicle is crossing the field of emission, would cyclically record the same code since it would always cyclically receive the same square wave. However, on leaving the field of emission, the last square wave could only be received partially, which would supply at the output of register S a code which would not correspond to the exact width of the square wave and so the exact speed limit.

With the device of the invention, shown in FIG. 12, on leaving the field of the beacon, the monostable circuit MsA returns to the rest state and the device is again in the alert condition ready for crossing into the next field of emission of a beacon.

It is to be noted that the field of emission of the beacon can only cover the entry into the speed restricted zone since outputs $S_a \ldots S_d$ of register S keep in store the speed restriction information.

There can be provided at the exit of the speed restricted zone, a beacon transmitting a signal for resetting register S which can be a smaller square wave, a smaller voltage or a blip. This beacon can be used for the three forms in which the information of the radio beacon is sent out.

We will consider now, with reference to FIGS. 16 and 18, an embodiment of the device intended to operate with outside information contained in the frequency or in the cyclical relationship of a train of pulses.

It is recalled that in the case where the information is contained in the cyclical relationship, the pulses permanently transmitted by the beacon are at a constant frequency but that the relationship between the width of the pulse and the period of the pulse may vary. This relationship remains constant for a determined cyclical relationship.

In FIG. 16 there is shown diagrammatically at f a succession of pulses picked up by sensor 2a; preferably these pulses are calibrated.

The device comprises a shaping circuit 3a for completing the shaping of the pulses. The output of this circuit 3a is connected to the input of an integrator circuit 50 which supplies at its output a DC signal obtained by integration of pulses f. This voltage depends on the frequency or on the cyclical relationship of the pulses and represents therefore the speed limit.

In the particular application contemplated, with five speed limits it is possible to pick up at the output of the integrator 50 five different voltage values.

The coding of the value of the voltage at the output of integrator 50 is effected in the following way.

Four voltage comparators 51, 52, 53 and 54 are connected in parallel to the output of integrator circuit 50. These comparators are able to switch, at their output, when the voltage signal at the input exceeds a preset voltage threshold. This voltage threshold can be set, for each comparator, with a potentiometer such as 55.

The thresholds of comparators 51 . . . 54 are inserted between the five voltage levels which may appear at the output of integrator 50 and which correspond to the five different speed limits. These levels, designated by $v_1 \ldots v_5$ have been plotted in FIG. 17 as abscissa. At the different lines of FIG. 17 there is shown the state of the output of comparators 51 . . . 54, it can be seen that the switching threshold of comparator 51 is between $v_1$ and $v_2$ and so on for the other comparators.

In the embodiment contemplated, the rest state at the output of the comparators corresponds to a low level represented by the figure 0; the switching corresponds, at the output of the comparator, to the high level represented by figure 1. Thus, for each voltage at the output of integrator 50, a code will be produced which will comprise as many high levels (figures 1) as the voltage corresponding to the speed signal is high. The smallest of the voltages at the output of 50 will be translated in the code by four 0, as shown in the first column of FIG. 10, of the table summarizing the codes for each voltage (or speed); the smallest voltage corresponds then to the maximum speed limit of 130 kph.

The other increasing voltage values $v_2 \ldots v_5$ correspond to decreasing values of the speed limit.

The outputs of the comparators are connected to the four parallel inputs $E_a \ldots E_d$ of the parallel shift register S.

The transfer of the code between the inputs and the outputs of register S, which provides also for the storing of the code at these outputs, is controlled by a monostable circuit 56 whose input is connected to the output of integrator 50 and whose output is connected to the clock input H of register S. This monostable circuit 56 is triggered by the appearance of the rising front at the output of integrator 50, i.e. by the appearance of the voltage signal.

The output of monostable circuit 56 returns to its rest state after a time equal to the switching time of this monostable circuit. The return of output 56 to the rest state triggers clock H of register S so that the code of the input is transferred and stored in outputs $S_a \ldots S_d$. The switching time of monostable circuit 56 is such that the storing in the register is triggered off before the vehicle leaves the field of emission of the beacon. The switching time of monostable circuit 56 allows a voltage signal to be established at the output of integrator 50 and an exact code to be established at inputs $E_a \ldots E_d$.

An initial condition circuit $C_o$ able to act on resetting input RAZ of register S is also provided, as in the case of FIG. 12.

The operation of the device of FIG. 16 comes out clearly from the preceding explanations.

When the vehicle enters the field of emission of the beacon, a voltage signal, which is maintained during the whole time that the vehicle remains in the field of emission, appears at the output of integrator 50. Comparators 51 ... 54 effect the coding of this signal and monostable circuit 56 transfers this coded signal to the outputs of register S, with storage at these outputs.

Speed limiter C maintains the speed of the vehicle at the value corresponding to the coding.

Monostable circuit 56 which triggers off the clock of register S cannot be triggered twice during the time that the vehicle is crossing the field of emission of a beacon, for the output level of integrator 50 remains high (presence of a permanent voltage signal). When the vehicle leaves the field of emission of the beacon, the level at the output of integrator 50 drops and monostable circuit 56 is again ready to be triggered by the next rising front at the output of integrator 50, when the vehicle again enters the field of emission of a beacon.

Let us consider now FIGS. 19 to 21 which concern an embodiment of the device of the invention intended to operate in the case where the information is contained in a number of cyclically emitted pulses. To each speed limit corresponds a different number of pulses or blips.

At the output of receiver 2a, in FIG. 19, there is shown diagrammatically a group of three pulses. These signals drive the input of a shaping circuit 3'a (monostable circuit).

It is desired to maintain a coding table, shown in FIG. 21, identical to those of FIGS. 14 and 18. A simple solution consists in providing, for the first column corresponding to four 0, a single blip cyclically emitted by the beacon. For the following columns there is provided respectively two, three, four and five blips.

The device is so arranged that the first blip received causes the resetting of the outputs of shift register S'. This register S' has four outputs in parallel $S'_a \ldots S'_d$ and is arranged to operate with right shift; that means that each time that input H' receives a signal triggering the clock, there is a progression from output $S_a$ to output $S_d$ of level 1, at each clock triggering level 1 being propagated to the immediately adjacent output. Register S' comprises an input E' at which is maintained level 1 which is successively transmitted to the different outputs at each clock triggering.

These clock triggerings are controlled by the pulses themselves; for that the output of shaping circuit 3'a is connected, through a gate $G'_1$ similar to gate $G_1$ of FIG. 12, to terminal H'.

The output of gate $G'_1$ is also connected to the input of another gate $G_2$; the output of this latter gate is connected to a resetting terminal RAZ of register S' by means of gate $G'_2$ which is always open. Another input of gate $G_2$ is connected to the output of monostable circuit 57.

This monostable circuit 57 can be retriggered and is intended to inhibit the resetting of register S' after the first pulse.

Monostable circuit 57 has a switching time greater than the time interval separating two consecutive blips but less than the period in which the groups of pulses are emitted. The switching of monostable circuit 57 is controlled by the descending front of the pulses.

The operation is summarized by the two first lines of FIG. 20. The first line shows the groups of blips at the output of shaping circuit 3'a. The first group has only two blips for it has been supposed that when the vehicle enters the field of emission of a beacon only the first two blips of a group of three have been received. The second group of blips is complete and comprises three.

The second line of this FIG. 20 shown the state of the output of monostable circuit 57. A monostable circuit has been chosen whose output, at the rest state, is at the high level represented by 1. The monostable circuit 57 switches and its output passes to the low level (figure 0), with the descending front of the first blip appearing at the output of shaping circuit 3'a. Because it can be retriggered, as explained above, the monostable circuit 57 remains switched during the whole of the duration of the group of pulses and returns to its rest state only after a time δt, corresponding to its switching time, after the first descending front of the group of pulses. This return to the rest state takes place before the appearance of the new group of pulses. The output of monostable circuit 57 again switches with the descending front of the first pulse of the second group received.

Gate $G_2$ is an AND gate. This gate transmits a pulse to reset terminal RAZ only when both of its inputs are driven by a signal corresponding to a high level. As can be seen from the first two lines of FIG. 20, gate $G_2$ is open for the first pulse because the output of monostable circuit 57 has not yet switched, which allows the first pulse of the group of blips received to command the resetting of register S'. After the switching of monostable circuit 57, gate $G_2$ is closed and the pulses are no longer transmitted to the reset terminal which is thus inhibited.

On the other hand, the pulses continue to be transmitted to terminal H' of the clock. From the second pulse, the right shift at outputs $S'_a \ldots S'_d$ will begin to take place. This means that for a group of two pulses, output $S'_a$ will be at level 1 whereas the following outputs located on the right will remain at level 0. For a group of three pulses the first two outputs $S_a$, $S_b$ will be at level 1 whereas the other two outputs $S_c$ and $S_d$ will still be at level 0 as shown in the third column of FIG. 21. When the groups of pulses comprise respectively four and five pulses, the coding is that shown in the last two columns of the table of FIG. 21 which shows that the high levels (1) progress from one output towards output $S_d$) at each additional pulse.

A device comprising two monostable circuits M'sA and M'sB, similar to the one of FIG. 12, is provided so that the speed limit can be established with the second group of pulses received by the vehicle entering the field of emission of the beacon and for inhibiting the following groups of pulses.

The monostable circuit M'sA has its input connected to the output of monostable circuit 57. This monostable circuit M'sA can be retriggered by the signal at the output of monostable circuit 57 so that this monostable circuit M'sA remains switched during the whole time that the vehicle is in the field of emission of the beacon. The output of this monostable circuit M'sA is connected to a terminal of gate $G'_1$ (OR gate) and to the imput of a second monostable circuit M'sB triggered by the signals at the output of monostable circuit M'sA. The switching time of this monostable circuit M'sB is such that it returns to its rest state before the beginning of the third group of pulses.

The third line of FIG. 20 shows schematically the state of the output of monostable circuit M'sA. This output is in the rest condition (high level represented by 1) until the appearance of the descending front at the output of monostable circuit 57. The switching time of monostable circuit M'sA is greater than the period when descending fronts appear at the output of monostable circuit 57 so that the monostable circuit M'sA remains switched during the whole time that the vehicle is crossing the field of emission.

The fourth line of FIG. 20 shows schematically the state of the output of monostable circuit M'sB. The rest state of this output is a low level (0). This output passes to the high level (1) with the descending front appearing at the output of M'sA. The output of monostable circuit M'sB returns to level 0 before the beginning of the third group of pulses received.

The fifth line of FIG. 20 shows the logic sum of the M'sA and M'sB outputs. This sum remains equal to 1 until the output of monostable circuit M'sB returns to level 0. As long as this sum is equal to 1, gate $G'_1$ is open; the last code stored at outputs $S'_a \ldots S'_d$ of register S' corresponds to the second group of pulses received which is complete so that there is stored a code corresponding to the exact speed.

Since the gate $G'_1$ is then closed the following groups of pulses will not modify the code present at the output of S'.

When the vehicle leaves the field of the beacon, monostable circuit M'sA falls again and at the moment of entering the field of the next beacon the first pulse received again causes resetting of register S'. The procedure described above then recommences.

An initial condition circuit $C'_o$ is also provided in the circuit of FIG. 19. This circuit $C'_o$ is able to send out a pulse to the input of OR gate $G'_2$ connected to the output of the gate $G_2$, when the ignition of the vehicle is switched on.

We find that a situation similar to that of the preceding embodiments.

The description relative to FIGS. 9 to 21 concerns more particularly the case where the outside information is supplied by ratio beacons. However, it is clear that the invention could also be applied if the outside information were supplied in a different way, e.g. by transversal magnetic strips embedded in the roadway on which the vehicle is moving or by reflecting devices able to supply optical signals.

The use of transistors for connection means La leads to a simple construction; other means could however be used, such as diodes.

The device of the invention allows a speed restriction to be automatically controlled with simple means and in a reliable and efficient way.

Whatever the embodiment, the program of speeds, particularly with voltage divider bridges, permits voltages to be obtained, corresponding to the speed limits, whose values are accurate. The accuracy of these values is independent, to a great extent, of the accuracy of the outside information controlling the speed limits; in particular, when the outside information is contained in a frequency, possible fluctuations of this frequency on both sides of an average value will have no influence on the accuracy of the speed limit, as long as these fluctuations remain within a range covering the selection of the appropriate voltage.

It is, furthermore, possible to modify the speed program at will without having to modify the information emission sub-structure.

While the invention has been described and shown with particular reference to the preferred embodiment, it will be apparent that variations might be possible that would fall within the scope of the present invention which is not intended to be limited except as defined in the following claims.

We claim:

1. A device for automatically restricting the speed of a vehicle, particularly a motor vehicle, travelling over a stretch of road subject to a speed restriction in accordance with speed limit information coming from outside the vehicle, comprising:

means for coding speed limit information received from outside the vehicle including a shift register having n outputs each assuming one of two possible logic states;

program means responsive to said means for coding to provide an electrical voltage in correspondence with received speed limit information, said program means comprising n+1 voltage divider bridges each having an intermediate point between a constant voltage souce and ground, each intermediate point being connected to a common line by a diode, the n+1 diodes associated with the intermediate points being connected so that the greatest of the voltages appearing at the intermediate points appears on the common line;

electrical connection means connected between the n intermediate points whose voltage is normally higher than that of the intermediate point having the lowest voltage and the n outputs of the shift register, said electrical connection means being responsive to the logic states at the outputs of said shift register and being arranged such that for one of the two logic states at an output of said shift register, the voltage at the intermediate point associated with this output is cancelled, whereas for the other of the two logic states at an output of the shift register the voltage at the intermediate point associated with this output is maintained; and, control means responsive to the value of the voltage which appears on said common line for controlling the speed of the vehicle.

2. A device according to claim 1 wherein said electrical connection means is arranged to form a conductive path to inhibit the voltage at an intermediate point when the logic state of an associated output of the shift register is at a high level and to disable the conductive path and maintain a voltage at an intermediate point when the logic state of an associated output is at a low level.

3. A device according to claim 2 wherein said electrical connection means comprises a plurality of NPN transistors respectively connected to the outputs of said shift register, each having a collector connected to an associated intermediate point and an emitter connected to ground, each transistor being enabled to establish a said conductive path and substantially cancel the voltage at an associated intermediate point when the logic state at the corresponding output of the shift register is at a high logic level and being disabled forming no conductive path to maintain the voltage at an associated intermediate point when the corresponding output of the shift register is at a low logic level.

4. A device according to claim 1 wherein said speed limit information is sent periodically and permanently by beacons to said vehicle, either in the form of periodic square waves of variable width, the width of the square wave corresponding to a determined speed limit, or in the form of a definite number of cyclically emitted pulses, the number of pulses being associated with a definite speed limit, said device further comprising means for ensuring that a complete group of information data received by the vehicle is used for speed control, said complete group of information data being a second group of information received by the vehicle after receipt of a first group of information when the vehicle enters the field of information emission, said means for ensuring also inhibiting the information received after said complete group from controlling said vehicle.

5. A device according to claim 4 wherein said means for ensuring comprises a first monostable circuit which can be retriggered having its switching controlled by received speed limit information, the switching time of said first monostable circuit being greater than the period of the received information so that said first monostable circuit remains triggered during the entire time the vehicle is in the emission field of the information, the output of said first monostable circuit being connected to the input of a second monostable circuit whose switching time is greater than the period of the information, but is less than the time interval separating the end of a first group of information from the beginning of a third group of information, the output signals of said first and second monostable circuits driving a gate which controls the triggering of a clock input of the shift register in accordance with the received groups of information, said first and second monostable circuits being arranged such that said gate remains open during the reception of the first two groups of information and closes after the end of reception of the second group of information and before the beginning of the third group of information so that the speed limit is determined from the complete second group of information and following groups of information received by the vehicle do not influence the determined value of the speed limit.

6. A device according to claim 1 wherein the outside information is contained in a cyclically and permanently emitted square wave of variable width according to the set speed limit, the number of possible widths of the square waves being equal to $n+1$, n being the number of outputs of the shift register, and wherein said coding means comprises an n number of monostable circuits triggered simultaneously by an edge of the square wave, the switching time of said n monostable circuits residing between the $n+1$ possible widths for the square waves, the outputs of these n monostable circuits being connected to n parallel inputs of the shift register.

7. A device according to claim 1 wherein said outside information is contained in the frequency or cyclic relationship of a train of pulses, $n+1$ values being possible for this frequency or cyclic relationship, and wherein said coding means comprises an integrator circuit establishing a DC voltage depending on the information received and n voltage comparators connected in parallel to the output of the integrator, said n comparators having switching thresholds which reside between the $n+1$ voltage levels able to appear at the output of the integrator, the outputs of said n comparators being connected in parallel to the n inputs of said shift register.

8. A device according to claim 1 wherein said outside information is contained in a number of cyclically emitted pulses, said number of pulses being able to assume $n+1$ values corresponding to a like number of possible speed limits, said device further comprising means responsive to the first pulse received for resetting the shift register and to the following received pulses for triggering the clock input of the shift register so that the coding is directly provided by said shift register.

9. A device according to claim 8 wherein said means for resetting and triggering comprises a gate and a first monostable circuit shaping received information pulses and having an output connected to the input of a second retriggerable monostable circuit having a switching time which is just greater than the period of the pulses of a group of information, said second retriggerable monostable circuit controlling the opening of said gate to let the first pulse pass to reset the shift register, said second retriggerable monostable circuit then commanding, by switching caused by the descending front of the first pulse, the closing of said gate to prevent resetting of the shift register by following pulses, said following pulses being coupled to the clock input of the shift register.

10. A device according to claim 1 wherein said voltage divider bridges of said program means are arranged in a succession of increasing values of intermediate point voltage corresponding to a succession of increasing values of speed limits, the code of the speed limits being established so that the maximum speed limit corresponds to an absence of voltage on all outputs of the shift register.

11. A device according to claim 10 further comprising an initial condition circuit which provides for the resetting of the shift register when the ignition of the vehicle is switched on so that the driver, when restarting his vehicle after a stop, is not subjected to a speed limit which is too low.

* * * * *